United States Patent
Raichelgauz et al.

(10) Patent No.: US 10,848,590 B2
(45) Date of Patent: Nov. 24, 2020

(54) SYSTEM AND METHOD FOR DETERMINING A CONTEXTUAL INSIGHT AND PROVIDING RECOMMENDATIONS BASED THEREON

(71) Applicant: Cortica, Ltd., Tel Aviv (IL)

(72) Inventors: Igal Raichelgauz, New York, NY (US); Karina Odinaev, New York, NY (US); Yehoshua Y Zeevi, Haifa (IL)

(73) Assignee: CORTICA LTD, Tel Aviv (IL)

( * ) Notice: Subject to any disclaimer, the term of this patent is extended or adjusted under 35 U.S.C. 154(b) by 1108 days.

(21) Appl. No.: 15/206,711

(22) Filed: Jul. 11, 2016

(65) Prior Publication Data

US 2016/0342593 A1    Nov. 24, 2016

Related U.S. Application Data

(63) Continuation-in-part of application No. 14/280,928, filed on May 19, 2014, and a continuation-in-part of
(Continued)

(51) Int. Cl.
*G06F 16/9535*    (2019.01)
*H04L 29/08*    (2006.01)
(Continued)

(52) U.S. Cl.
CPC ........ *H04L 67/306* (2013.01); *G06F 16/9535* (2019.01); *H04H 60/31* (2013.01);
(Continued)

(58) Field of Classification Search
CPC ...................................................... G06F 15/18
(Continued)

(56) References Cited

U.S. PATENT DOCUMENTS

| 4,733,353 A | 3/1988 | Jaswa |
| 4,932,645 A | 6/1990 | Schorey et al. |

(Continued)

FOREIGN PATENT DOCUMENTS

| WO | 0231764 | 4/2002 |
| WO | 0231764 A2 | 4/2002 |

(Continued)

OTHER PUBLICATIONS

Iwamoto et al., Image Signature Robust to Caption Superimposition for Video Sequence Identification, 2006, IEEE, p. 3185-3188 (Year: 2006).*

(Continued)

*Primary Examiner* — David R Vincent
(74) *Attorney, Agent, or Firm* — Reches Patent

(57) ABSTRACT

A system, method, and computer-readable medium for providing recommendations based on a user interest. The method includes: generating at least one signature for at least one multimedia content element; querying, based on the generated at least one signature, a user profile to identify the user interest related to the at least one multimedia content element; generating at least one contextual insight based on the user interest, wherein each contextual insight indicates a user preference; searching for at least one content item that matches the at least one contextual insight; and causing a display of the at least one matching content item as a recommendation.

2 Claims, 7 Drawing Sheets

Related U.S. Application Data application No. 13/856,201, filed on Apr. 3, 2013, said application No. 14/280,928 is a continuation-in-part of application No. 13/624,397, filed on Sep. 21, 2012, now Pat. No. 9,191,626, which is a continuation-in-part of application No. 13/344,400, filed on Jan. 5, 2012, now Pat. No. 8,959,037, which is a continuation of application No. 12/434,221, filed on May 1, 2009, now Pat. No. 8,112,376, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, said application No. 13/624,397 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 13/624,397 is a continuation-in-part of application No. 12/084,150, filed as application No. PCT/IL2006/001235 on Oct. 26, 2006, now Pat. No. 8,655,801.

(60) Provisional application No. 62/274,295, filed on Jan. 3, 2016, provisional application No. 61/833,028, filed on Jun. 10, 2013, provisional application No. 61/766,016, filed on Feb. 18, 2013.

(51) Int. Cl.

| | |
|---|---|
| *H04H 60/66* | (2008.01) |
| *H04H 60/37* | (2008.01) |
| *H04H 60/46* | (2008.01) |
| *H04N 21/81* | (2011.01) |
| *H04H 60/56* | (2008.01) |
| *H04N 21/2668* | (2011.01) |
| *H04N 21/466* | (2011.01) |
| *H04N 7/173* | (2011.01) |
| *H04N 21/258* | (2011.01) |
| *H04H 60/33* | (2008.01) |
| *H04H 60/31* | (2008.01) |

(52) U.S. Cl.
CPC ............ *H04H 60/33* (2013.01); *H04H 60/37* (2013.01); *H04H 60/46* (2013.01); *H04H 60/56* (2013.01); *H04H 60/66* (2013.01); *H04N 7/17318* (2013.01); *H04N 21/25891* (2013.01); *H04N 21/2668* (2013.01); *H04N 21/466* (2013.01); *H04N 21/8106* (2013.01); *H04H 2201/90* (2013.01); *H04L 67/22* (2013.01)

(58) Field of Classification Search
USPC .................................................... 706/15, 45
See application file for complete search history.

(56) References Cited

U.S. PATENT DOCUMENTS

| | | |
|---|---|---|
| 4,972,363 A | 11/1990 | Nguyen et al. |
| 5,214,746 A | 5/1993 | Fogel et al. |
| 5,307,451 A | 4/1994 | Clark |
| 5,568,181 A | 10/1996 | Greenwood et al. |
| 5,638,425 A | 6/1997 | Meador et al. |
| 5,745,678 A | 4/1998 | Herzberg et al. |
| 5,763,069 A | 6/1998 | Jordan |
| 5,806,061 A | 9/1998 | Chaudhuri et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,978,754 A | 11/1999 | Kumano |
| 5,987,454 A | 11/1999 | Hobbs |
| 5,991,306 A | 11/1999 | Burns et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,240,423 B1 | 5/2001 | Hirata |
| 6,243,375 B1 | 6/2001 | Speicher |
| 6,243,713 B1 | 6/2001 | Nelson et al. |
| 6,275,599 B1 | 8/2001 | Adler et al. |
| 6,329,986 B1 | 12/2001 | Cheng |
| 6,363,373 B1 | 3/2002 | Steinkraus |
| 6,381,656 B1 | 4/2002 | Shankman |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,507,672 B1 | 1/2003 | Watkins et al. |
| 6,523,022 B1 | 2/2003 | Hobbs |
| 6,523,046 B2 | 2/2003 | Liu et al. |
| 6,524,861 B1 | 2/2003 | Anderson |
| 6,550,018 B1 | 4/2003 | Abonamah et al. |
| 6,557,042 B1 | 4/2003 | He et al. |
| 6,560,597 B1 | 5/2003 | Dhillon et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,611,837 B2 | 8/2003 | Schreiber |
| 6,618,711 B1 | 9/2003 | Ananth |
| 6,640,015 B1 | 10/2003 | Lafruit |
| 6,643,620 B1 | 11/2003 | Contolini et al. |
| 6,643,643 B1 | 11/2003 | Lee et al. |
| 6,665,657 B1 | 12/2003 | Dibachi |
| 6,675,159 B1 | 1/2004 | Lin et al. |
| 6,704,725 B1 | 3/2004 | Lee |
| 6,728,706 B2 | 4/2004 | Aggarwal et al. |
| 6,732,149 B1 | 5/2004 | Kephart |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,836,776 B2 | 12/2004 | Schreiber |
| 6,845,374 B1 | 1/2005 | Oliver et al. |
| 6,901,207 B1 | 5/2005 | Watkins |
| 6,938,025 B1 | 8/2005 | Lulich et al. |
| 6,970,881 B1 | 11/2005 | Mohan et al. |
| 6,978,264 B2 | 12/2005 | Chandrasekar et al. |
| 6,985,172 B1 | 1/2006 | Rigney et al. |
| 7,006,689 B2 | 2/2006 | Kasutani |
| 7,013,051 B2 | 3/2006 | Sekiguchi et al. |
| 7,020,654 B1 | 3/2006 | Najmi |
| 7,043,473 B1 | 5/2006 | Rassool et al. |
| 7,124,149 B2 | 10/2006 | Smith et al. |
| 7,158,681 B2 | 1/2007 | Persiantsev |
| 7,199,798 B1 | 4/2007 | Echigo et al. |
| 7,215,828 B2 | 5/2007 | Luo |
| 7,260,564 B1 | 8/2007 | Lynn et al. |
| 7,277,928 B2 | 10/2007 | Lennon |
| 7,296,012 B2 | 11/2007 | Ohashi |
| 7,299,261 B1 | 11/2007 | Oliver et al. |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,376,722 B1 | 5/2008 | Sim et al. |
| 7,406,459 B2 | 7/2008 | Chen et al. |
| 7,433,895 B2 | 10/2008 | Li et al. |

(56) References Cited

U.S. PATENT DOCUMENTS

| | | |
|---|---|---|
| 7,450,740 B2 | 11/2008 | Shah et al. |
| 7,464,086 B2 | 12/2008 | Black et al. |
| 7,523,102 B2 | 4/2009 | Bjarnestam et al. |
| 7,526,607 B1 | 4/2009 | Singh et al. |
| 7,529,659 B2 | 5/2009 | Wold |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |
| 7,577,656 B2 | 8/2009 | Kawai et al. |
| 7,657,100 B2 | 2/2010 | Gokturk et al. |
| 7,660,468 B2 | 2/2010 | Gokturk et al. |
| 7,660,737 B1 | 2/2010 | Lim et al. |
| 7,694,318 B2 | 4/2010 | Eldering et al. |
| 7,697,791 B1 | 4/2010 | Chan et al. |
| 7,769,221 B1 | 8/2010 | Shakes et al. |
| 7,788,132 B2 | 8/2010 | Desikan et al. |
| 7,801,893 B2 | 9/2010 | Gulli |
| 7,836,054 B2 | 11/2010 | Kawai et al. |
| 7,860,895 B1 | 12/2010 | Scofield |
| 7,904,503 B2 | 3/2011 | De |
| 7,921,107 B2 | 4/2011 | Chang et al. |
| 7,933,407 B2 | 4/2011 | Keidar et al. |
| 7,974,994 B2 | 7/2011 | Li et al. |
| 7,987,217 B2 | 7/2011 | Long et al. |
| 7,991,715 B2 | 8/2011 | Schiff et al. |
| 8,036,893 B2 | 10/2011 | Reich |
| 8,098,934 B2 | 1/2012 | Vincent |
| 8,112,376 B2 | 2/2012 | Raichelgauz et al. |
| 8,266,185 B2 | 9/2012 | Raichelgauz et al. |
| 8,275,764 B2 | 9/2012 | Jeon |
| 8,312,031 B2 | 11/2012 | Raichelgauz et al. |
| 8,315,442 B2 | 11/2012 | Gokturk et al. |
| 8,316,005 B2 | 11/2012 | Moore |
| 8,326,775 B2 | 12/2012 | Raichelgauz et al. |
| 8,345,982 B2 | 1/2013 | Gokturk et al. |
| RE44,225 E | 5/2013 | Aviv |
| 8,457,827 B1 | 6/2013 | Ferguson et al. |
| 8,495,489 B1 | 7/2013 | Everingham |
| 8,527,978 B1 | 9/2013 | Sallam |
| 8,548,828 B1 | 10/2013 | Longmire |
| 8,634,980 B1 | 1/2014 | Urmson |
| 8,655,801 B2 | 2/2014 | Raichelgauz et al. |
| 8,655,878 B1 | 2/2014 | Kulkarni et al. |
| 8,677,377 B2 | 3/2014 | Cheyer et al. |
| 8,682,667 B2 | 3/2014 | Haughay |
| 8,706,503 B2 | 4/2014 | Cheyer et al. |
| 8,775,442 B2 | 7/2014 | Moore et al. |
| 8,781,152 B2 | 7/2014 | Momeyer |
| 8,782,077 B1 | 7/2014 | Rowley |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,619 B2 | 10/2014 | Raichelgauz et al. |
| 8,868,861 B2 | 10/2014 | Shimizu et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Gray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,298,763 B1 | 3/2016 | Zack |
| 9,323,754 B2 | 4/2016 | Ramanathan et al. |
| 9,330,189 B2 | 5/2016 | Raichelgauz et al. |
| 9,438,270 B2 | 9/2016 | Raichelgauz et al. |
| 9,440,647 B1 | 9/2016 | Sucan |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,734,533 B1 | 8/2017 | Givot |
| 9,807,442 B2 | 10/2017 | Bhatia et al. |
| 9,984,369 B2 | 5/2018 | Li et al. |
| 10,133,947 B2 | 11/2018 | Yang |
| 10,347,122 B2 | 7/2019 | Takenaka |
| 10,491,885 B1 | 11/2019 | Hicks |
| 2001/0019633 A1 | 9/2001 | Tenze |
| 2001/0038876 A1 | 11/2001 | Anderson |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0019882 A1 | 2/2002 | Bokhani |
| 2002/0032677 A1 | 3/2002 | Morgenthaler et al. |
| 2002/0037010 A1 | 3/2002 | Yamauchi |
| 2002/0038299 A1 | 3/2002 | Zernik et al. |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0123928 A1 | 9/2002 | Eldering et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas |
| 2002/0174095 A1 | 11/2002 | Lulich et al. |
| 2002/0178410 A1 | 11/2002 | Haitsma et al. |
| 2003/0028660 A1 | 2/2003 | Igawa et al. |
| 2003/0037010 A1 | 2/2003 | Schmelzer |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0101150 A1 | 5/2003 | Agnihotri |
| 2003/0105739 A1 | 6/2003 | Essafi et al. |
| 2003/0126147 A1 | 7/2003 | Essafi et al. |
| 2003/0182567 A1 | 9/2003 | Barton et al. |
| 2003/0191764 A1 | 10/2003 | Richards |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0059736 A1 | 3/2004 | Willse |
| 2004/0068510 A1 | 4/2004 | Hayes et al. |
| 2004/0091111 A1 | 5/2004 | Levy |
| 2004/0107181 A1 | 6/2004 | Rodden |
| 2004/0111465 A1 | 6/2004 | Chuang et al. |
| 2004/0117367 A1 | 6/2004 | Smith et al. |
| 2004/0117638 A1 | 6/2004 | Monroe |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0230572 A1 | 11/2004 | Omoigui |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0172130 A1 | 8/2005 | Roberts |
| 2005/0177372 A1 | 8/2005 | Wang et al. |
| 2005/0193015 A1 | 9/2005 | Logston |

(56) References Cited

U.S. PATENT DOCUMENTS

| | | |
|---|---|---|
| 2005/0238198 A1 | 10/2005 | Brown et al. |
| 2005/0238238 A1 | 10/2005 | Xu et al. |
| 2005/0245241 A1 | 11/2005 | Durand et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020958 A1 | 1/2006 | Allamanche et al. |
| 2006/0031216 A1 | 2/2006 | Semple et al. |
| 2006/0033163 A1 | 2/2006 | Chen |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0100987 A1 | 5/2006 | Leurs |
| 2006/0112035 A1 | 5/2006 | Cecchi et al. |
| 2006/0120626 A1 | 6/2006 | Perlmutter |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0224529 A1 | 10/2006 | Kermani |
| 2006/0236343 A1 | 10/2006 | Chang |
| 2006/0242130 A1 | 10/2006 | Sadri |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1* | 11/2006 | Barton .............. H04H 60/27 725/46 |
| 2006/0251339 A1 | 11/2006 | Gokturk |
| 2006/0253423 A1 | 11/2006 | McLane et al. |
| 2006/0288002 A1 | 12/2006 | Epstein et al. |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0022374 A1 | 1/2007 | Huang et al. |
| 2007/0033163 A1 | 2/2007 | Epstein et al. |
| 2007/0038608 A1 | 2/2007 | Chen |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130112 A1 | 6/2007 | Lin |
| 2007/0130159 A1 | 6/2007 | Gulli et al. |
| 2007/0156720 A1 | 7/2007 | Maren |
| 2007/0168413 A1 | 7/2007 | Barletta et al. |
| 2007/0174320 A1 | 7/2007 | Chou |
| 2007/0195987 A1 | 8/2007 | Rhoads |
| 2007/0196013 A1 | 8/2007 | Li |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0282826 A1 | 12/2007 | Hoeber et al. |
| 2007/0294295 A1 | 12/2007 | Finkelstein et al. |
| 2007/0298152 A1 | 12/2007 | Baets |
| 2008/0040277 A1 | 2/2008 | DeWitt |
| 2008/0046406 A1 | 2/2008 | Seide et al. |
| 2008/0049629 A1 | 2/2008 | Morrill |
| 2008/0072256 A1 | 3/2008 | Boicey et al. |
| 2008/0091527 A1 | 4/2008 | Silverbrook et al. |
| 2008/0109433 A1 | 5/2008 | Rose |
| 2008/0152231 A1 | 6/2008 | Gokturk |
| 2008/0163288 A1 | 7/2008 | Ghosal et al. |
| 2008/0165861 A1 | 7/2008 | Wen |
| 2008/0166020 A1 | 7/2008 | Kosaka |
| 2008/0172615 A1 | 7/2008 | Igelman et al. |
| 2008/0201299 A1 | 8/2008 | Lehikoinen et al. |
| 2008/0201314 A1 | 8/2008 | Smith et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura |
| 2008/0263579 A1 | 10/2008 | Mears et al. |
| 2008/0270373 A1 | 10/2008 | Oostveen et al. |
| 2008/0270569 A1 | 10/2008 | McBride |
| 2008/0294278 A1 | 11/2008 | Borgeson |
| 2008/0307454 A1 | 12/2008 | Ahanger et al. |
| 2008/0313140 A1 | 12/2008 | Pereira et al. |
| 2009/0022472 A1 | 1/2009 | Bronstein |
| 2009/0024641 A1 | 1/2009 | Quigley et al. |
| 2009/0034791 A1 | 2/2009 | Doretto |
| 2009/0037408 A1 | 2/2009 | Rodgers |
| 2009/0043637 A1 | 2/2009 | Eder |
| 2009/0043818 A1 | 2/2009 | Raichelgauz |
| 2009/0080759 A1 | 3/2009 | Bhaskar |
| 2009/0089587 A1 | 4/2009 | Brunk et al. |
| 2009/0119157 A1 | 5/2009 | Dulepet |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0216639 A1 | 8/2009 | Kapczynski et al. |
| 2009/0216761 A1 | 8/2009 | Raichelgauz |
| 2009/0245573 A1 | 10/2009 | Saptharishi et al. |
| 2009/0245603 A1 | 10/2009 | Koruga et al. |
| 2009/0254572 A1 | 10/2009 | Redlich et al. |
| 2009/0277322 A1 | 11/2009 | Cai et al. |
| 2009/0278934 A1 | 11/2009 | Ecker |
| 2009/0282218 A1 | 11/2009 | Raichelgauz et al. |
| 2010/0023400 A1 | 1/2010 | DeWitt |
| 2010/0042646 A1 | 2/2010 | Raichelgauz |
| 2010/0082684 A1* | 4/2010 | Churchill .......... G06F 16/9535 707/784 |
| 2010/0088321 A1 | 4/2010 | Solomon et al. |
| 2010/0104184 A1 | 4/2010 | Bronstein |
| 2010/0111408 A1 | 5/2010 | Matsuhira |
| 2010/0125569 A1 | 5/2010 | Nair |
| 2010/0162405 A1 | 6/2010 | Cook |
| 2010/0173269 A1 | 7/2010 | Puri et al. |
| 2010/0191567 A1 | 7/2010 | Lee et al. |
| 2010/0198626 A1 | 8/2010 | Cho et al. |
| 2010/0268524 A1 | 10/2010 | Nath et al. |
| 2010/0306193 A1 | 12/2010 | Pereira |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0029620 A1 | 2/2011 | Bonforte |
| 2011/0035289 A1 | 2/2011 | King et al. |
| 2011/0038545 A1 | 2/2011 | Bober |
| 2011/0052063 A1 | 3/2011 | McAuley et al. |
| 2011/0055585 A1 | 3/2011 | Lee |
| 2011/0106782 A1 | 5/2011 | Ke et al. |
| 2011/0145068 A1 | 6/2011 | King et al. |
| 2011/0164180 A1 | 7/2011 | Lee |
| 2011/0164810 A1 | 7/2011 | Zang et al. |
| 2011/0202848 A1 | 8/2011 | Ismalon |
| 2011/0208822 A1 | 8/2011 | Rathod |
| 2011/0246566 A1 | 10/2011 | Kashef |
| 2011/0251896 A1 | 10/2011 | Impollonia et al. |
| 2011/0276680 A1 | 11/2011 | Rimon |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0133497 A1 | 5/2012 | Sasaki |
| 2012/0150890 A1 | 6/2012 | Jeong et al. |
| 2012/0167133 A1 | 6/2012 | Carroll |
| 2012/0179642 A1 | 7/2012 | Sweeney et al. |
| 2012/0179751 A1 | 7/2012 | Ahn |
| 2012/0185445 A1 | 7/2012 | Borden et al. |

(56) References Cited

U.S. PATENT DOCUMENTS

| | | |
|---|---|---|
| 2012/0197857 A1 | 8/2012 | Huang |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0299961 A1 | 11/2012 | Ramkumar et al. |
| 2012/0301105 A1 | 11/2012 | Rehg et al. |
| 2009/0220138 A1 | 12/2012 | Zhang et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0086499 A1 | 4/2013 | Dyor et al. |
| 2013/0089248 A1 | 4/2013 | Remiszewski |
| 2013/0103814 A1 | 4/2013 | Carrasco |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0212493 A1 | 8/2013 | Krishnamurthy |
| 2013/0226820 A1 | 8/2013 | Sedota, Jr. |
| 2013/0226930 A1 | 8/2013 | Arngren et al. |
| 2013/0283401 A1 | 10/2013 | Pabla et al. |
| 2013/0332951 A1 | 12/2013 | Gharaat et al. |
| 2014/0025692 A1 | 1/2014 | Pappas |
| 2014/0059443 A1 | 2/2014 | Tabe |
| 2014/0095425 A1 | 4/2014 | Sipple |
| 2014/0111647 A1 | 4/2014 | Atsmon |
| 2014/0125703 A1 | 5/2014 | Roveta |
| 2014/0147829 A1 | 5/2014 | Jerauld |
| 2014/0152698 A1 | 6/2014 | Kim et al. |
| 2014/0169681 A1 | 6/2014 | Drake |
| 2014/0176604 A1 | 6/2014 | Venkitaraman et al. |
| 2014/0188786 A1 | 7/2014 | Raichelgauz et al. |
| 2014/0193077 A1 | 7/2014 | Shiiyama et al. |
| 2014/0201330 A1 | 7/2014 | Lozano Lopez |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2014/0341476 A1 | 11/2014 | Kulick et al. |
| 2014/0379477 A1 | 12/2014 | Sheinfeld |
| 2015/0033150 A1 | 1/2015 | Lee |
| 2015/0100562 A1 | 4/2015 | Kohlmeier et al. |
| 2015/0117784 A1 | 4/2015 | Lin |
| 2015/0134688 A1 | 5/2015 | Jing |
| 2015/0254344 A1 | 9/2015 | Kulkarni et al. |
| 2015/0286742 A1 | 10/2015 | Zhang et al. |
| 2015/0289022 A1 | 10/2015 | Gross |
| 2015/0324356 A1 | 11/2015 | Gutierrez et al. |
| 2015/0363644 A1 | 12/2015 | Wnuk |
| 2016/0007083 A1 | 1/2016 | Gurha |
| 2016/0026707 A1 | 1/2016 | Ong et al. |
| 2016/0210525 A1 | 7/2016 | Yang |
| 2016/0221592 A1 | 8/2016 | Puttagunta |
| 2016/0342683 A1 | 11/2016 | Kwon |
| 2016/0357188 A1 | 12/2016 | Ansari |
| 2017/0017638 A1 | 1/2017 | Satyavarta et al. |
| 2017/0032257 A1 | 2/2017 | Sharifi |
| 2017/0041254 A1 | 2/2017 | Agara Venkatesha Rao |
| 2017/0109602 A1 | 4/2017 | Kim |
| 2017/0154241 A1 | 6/2017 | Shambik et al. |
| 2017/0255620 A1 | 9/2017 | Raichelgauz |
| 2017/0262437 A1 | 9/2017 | Raichelgauz |
| 2017/0323568 A1 | 11/2017 | Inoue |
| 2018/0081368 A1 | 3/2018 | Watanabe |
| 2018/0101177 A1 | 4/2018 | Cohen |
| 2018/0157916 A1 | 6/2018 | Doumbouya |
| 2018/0158323 A1 | 6/2018 | Takenaka |
| 2018/0204111 A1 | 7/2018 | Zadeh |
| 2019/0005726 A1 | 1/2019 | Nakano |
| 2019/0039627 A1 | 2/2019 | Yamamoto |
| 2019/0043274 A1 | 2/2019 | Hayakawa |
| 2019/0045244 A1 | 2/2019 | Balakrishnan |
| 2019/0056718 A1 | 2/2019 | Satou |
| 2019/0065951 A1 | 2/2019 | Luo |
| 2019/0188501 A1 | 6/2019 | Ryu |
| 2019/0220011 A1 | 7/2019 | Della Penna |
| 2019/0317513 A1 | 10/2019 | Zhang |
| 2019/0364492 A1 | 11/2019 | Azizi |
| 2019/0384303 A1 | 12/2019 | Muller |
| 2019/0384312 A1 | 12/2019 | Herbach |
| 2019/0385460 A1 | 12/2019 | Magzimof |
| 2019/0389459 A1 | 12/2019 | Berntorp |
| 2020/0004248 A1 | 1/2020 | Healey |
| 2020/0004251 A1 | 1/2020 | Zhu |
| 2020/0004265 A1 | 1/2020 | Zhu |
| 2020/0005631 A1 | 1/2020 | Visintainer |
| 2020/0018606 A1 | 1/2020 | Wolcott |
| 2020/0018618 A1 | 1/2020 | Ozog |
| 2020/0020212 A1 | 1/2020 | Song |
| 2020/0050973 A1 | 2/2020 | Stenneth |
| 2020/0073977 A1 | 3/2020 | Montemerlo |
| 2020/0090484 A1 | 3/2020 | Chen |
| 2020/0097756 A1 | 3/2020 | Hashimoto |
| 2020/0133307 A1 | 4/2020 | Kelkar |
| 2020/0043326 A1 | 6/2020 | Tao |

FOREIGN PATENT DOCUMENTS

| | | |
|---|---|---|
| WO | 2003005242 A1 | 1/2003 |
| WO | 2003067467 A1 | 8/2003 |
| WO | 2004019527 A1 | 3/2004 |
| WO | 2005027457 A1 | 3/2005 |
| WO | 2007049282 A2 | 5/2007 |
| WO | 20070049282 | 5/2007 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |

OTHER PUBLICATIONS

Big Bang Theory Series 04 Episode 12, aired Jan. 6, 2011; [retrieved from Internet: ].

Boari et al, "Adaptive Routing for Dynamic Applications in Massively Parallel Architectures", 1995 IEEE, Spring 1995, pp. 1-14.

Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.

Cernansky et al, "Feed-forward Echo State Networks", Proceedings of International Joint Conference on Neural Networks, Montreal, Canada, Jul. 31-Aug. 4, 2005, pp. 1-4.

Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.

Freisleben et al, "Recognition of Fractal Images Using a Neural Network", Lecture Notes in Computer Science, 1993, vol. 6861, 1993, pp. 631-637.

Garcia, "Solving the Weighted Region Least Cost Path Problem Using Transputers", Naval Postgraduate School, Monterey, California, Dec. 1989.

Hogue, "Tree Pattern Inference and Matching for Wrapper Induction on the World Wide Web", Master's Thesis, Massachusetts Institute of Technology, Jun. 2004, pp. 1-106.

Hogue, "Tree Pattern Inference and Matching for Wrapper Induction on the World Wide Web", Master's Thesis, Massachusetts institute of Technology, 2004, pp. 1-106.

Howlett et al, "A Multi-Computer Neural Network Architecture in a Virtual Sensor System Application", International Journal of knowledge-based intelligent engineering systems, 4 (2). pp. 86-93, 133N 1327-2314.

Hua et al., "Robust Video Signature Based on Ordinal Measure", Image Processing, 2004, 2004 International Conference on Image Processing (ICIP), vol. 1, IEEE, pp. 685-688, 2004.

(56) References Cited

OTHER PUBLICATIONS

International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
May et al, "The Transputer", Springer-Verlag Berlin Heidelberg 1989, vol. 41.
McNamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on CONTROL '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions on circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.

Stolberg et al, "Hibrid-Soc: A Mul Ti-Core Soc Architecture for Mul Timedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996. PDP '96, pp. 274-281.
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onlmage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University ADVENT Technical Report # 222-2006-8, Mar. 20, 2007, pp. 1-17.
Yanagawa et al., "Columbia University's Baseline Detectors for 374 LSCOM Semantic Visual Concepts", Columbia University ADVENT Technical Report #222, 2007, pp. 2006-2008.
Zhou et al, "Ensembling neural networks: Many could be better than all", National Laboratory for Novel Software Technology, Nanjing University, Hankou Road 22, Nanjing 210093, PR China Received Nov. 16, 2001, Available oinline Mar. 12, 2002, pp. 239-263.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.
Ma Et El. ("Semantics modeling based image retrieval system using neural networks" 2005 (Year: 2005).
Boari et al, "Adaptive Routing for Dynamic Applications in Massively Parallel Architectures", 1995 IEEE, Spring 1995.
Cernansky et al., "Feed-forward Echo State Networks"; Proceedings of International Joint Conference on Neural Networks, Montreal, Canada, Jul. 31-Aug. 4, 2005.
Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.
Cococcioni, et al, "Automatic Diagnosis of Defects of Rolling Element Bearings Based on Computational Intelligence Techniques", University of Pisa, Pisa, Italy, 2009.
Emami, et al, "Role of Spatiotemporal Oriented Energy Features for Robust Visual Tracking in Video Surveillance, University of Queensland", St. Lucia, Australia, 2012.
Fathy et al., "A Parallel Design and Implementation for Backpropagation Neural Network Using NIMD Architecture", 8th Mediterranean Electrotechnical Corsfe rersce, 19'96. MELECON '96, Date of Conference: May 13-16, 1996, vol. 3, pp. 1472-1475.
Foote, Jonathan et al., "Content-Based Retrieval of Music and Audio"; 1997, Institute of Systems Science, National University of Singapore, Singapore (Abstract).
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004. 1434102 IEEE Conference Publications, Hong Kong.
Guo et al, "AdOn: An Intelligent Overlay Video Advertising System", SIGIR, Boston, Massachusetts, Jul. 19-23, 2009.

(56) References Cited

OTHER PUBLICATIONS

Howlett et al., "A Multi-Computer Neural Network Architecture in a Virtual Sensor System Application", International Journal of Knowledge-based Intelligent Engineering Systems, 4 (2). pp. 86-93, I33N 1327-2314, Mar. 10, 2000.
International Search Authority: "Written Opinion of the International Searching Authority" (PCT Rule 43bis.1) including International Search Report for International Patent Application No. PCT/US2008/073852; dated Jan. 28, 2009.
International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; dated Jul. 28, 2009.
International Search Report for the related International Patent Application PCT/IL2006/001235; dated Nov. 2, 2008.
IPO Examination Report under Section 18(3) for corresponding UK application No. GB1001219.3, dated Sep. 12, 2011.
Iwamoto, K.; Kasutani, E.; Yamada, A.: "Image Signature Robust to Caption Superimposition for Video Sequence Identification"; 2006 IEEE International Conference on Image Processing; pp. 3185-3188, Oct. 8-11, 2006; doi: 10.1109/ICIP.2006.313046.
Jaeger, H.: "The "echo state" approach to analysing and training recurrent neural networks", GMD Report, No. 148, 2001, pp. 1-43, XP002466251 German National Research Center for Information Technology.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
Lin, C.; Chang, S.: "Generating Robust Digital Signature for Image/Video Authentication", Multimedia and Security Workshop at ACM Mutlimedia '98; Bristol, U.K., Sep. 1998; pp. 49-54.
Lin, et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Maass, W. et al.: "Computational Models for Generic Cortical Microcircuits", Institute for Theoretical Computer Science, Technische Universitaet Graz, Graz, Austria, published Jun. 10, 2003.
Mahdhaoui, et al, "Emotional Speech Characterization Based on Multi-Features Fusion for Face-to-Face Interaction", Universite Pierre et Marie Curie, Paris, France, 2009.
Marti, et al, "Real Time Speaker Localization and Detection System for Camera Steering in Multiparticipant Videoconferencing Environments", Universidad Politecnica de Valencia, Spain, 2011.
May et al., "The Transputer", Springer-Verlag, Berlin Heidelberg, 1989, teaches multiprocessing system.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.

Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
Nagy et al., "A Transputer, Based, Flexible, Real-Time Control System for Robotic Manipulators", UKACC International Conference on CONTROL'96, Sep. 2-5, 1996, Conference 1996, Conference Publication No. 427, IEE 1996.
Nam, et al., "Audio Visual Content-Based Violent Scene Characterization", Department of Electrical and Computer Engineering, Minneapolis, MN, 1998, pp. 353-357.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Ribert et al. "An Incremental Hierarchical Clustering", Visicon Interface 1999, pp. 586-591.
Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.
Semizarov et al. "Specificity of Short Interfering Rna Determined through Gene Expression Signatures", PNAS, 2003, pp. 6347-6352.
Theodoropoulos et al, "Simulating Asynchronous Architectures on Transputer Networks", Proceedings of the Fourth Euromicro Workshop on Parallel and Distributed Processing, 1996. PDP '96.
Vailaya, et al., "Content-Based Hierarchical Classification of Vacation Images," I.E.E.E.: Multimedia Computing and Systems, vol. 1, 1999, East Lansing, MI, pp. 518-523.
Vallet, et al., "Personalized Content Retrieval in Context Using Ontological Knowledge," IEEE Transactions on Circuits and Systems for Video Technology, vol. 17, No. 3, Mar. 2007, pp. 336-346.
Verstraeten et al., "Isolated word recognition with the Liquid State Machine; a case study", Department of Electronics and Information Systems, Ghent University, Sint-Pietersnieuwstraat 41, 9000 Gent, Belgium, Available online Jul. 14, 2005; Entire Document.
Verstraeten et al.: "Isolated word recognition with the Liquid State Machine; a case study", Information Processing Letters, Amsterdam, NL, col. 95, No. 6, Sep. 30, 2005 (Sep. 30, 2005), pp. 521-528, XP005028093 ISSN: 0020-0190.
Wang et al. "A Signature for Content-based Image Retrieval Using a Geometrical Transform", ACM 1998, pp. 229-234.
Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
The International Search Report and the Written Opinion for PCT/US2016/050471, ISA/RU, Moscow, RU, dated May 4, 2017.
The International Search Report and the Written Opinion for PCT/US2016/054634 dated Mar. 16, 2017, ISA/RU, Moscow, RU.
The International Search Report and the Written Opinion for PCT/US2017/015831, ISA/RU, Moscow, Russia, dated Apr. 20, 2017.
Brecheisen, et al., "Hierarchical Genre Classification for Large Music Collections", ICME 2006, pp. 1385-1388.
Chuan-Yu Cho, et al., "Efficient Motion-Vector-Based Video Search Using Query by Clip", 2004, IEEE, Taiwan, pp. 1-4.
Gomes et al., "Audio Watermaking and Fingerprinting: For Which Applications?" University of Rene Descartes, Paris, France, 2003.

(56) References Cited

OTHER PUBLICATIONS

Ihab Al Kabary, et al., "SportSense: Using Motion Queries to Find Scenes in Sports Videos", Oct. 2013, ACM, Switzerland, pp. 1-3.
Jianping Fan et al., "Concept-Oriented Indexing of Video Databases: Towards Semantic Sensitive Retrieval and Browsing", IEEE, vol. 13, No. 7, Jul. 2004, pp. 1-19.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Odinaev, et al., "Cliques in Neural Ensembles as Perception Carriers", Technion—Israel Institute of Technology, 2006 International Joint Conference on Neural Networks, Canada, 2006, pp. 285-292.
Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM. 2015.7314122 IEEE Conference Publications.
Shin-Fu Chang, et al., "VideoQ: A Fully Automated Video Retrieval System Using Motion Sketches", 1998, IEEE, , New York, pp. 1-2.
Wei-Te Li et al., "Exploring Visual and Motion Saliency for Automatic Video Object Extraction", IEEE, vol. 22, No. 7, Jul. 2013, pp. 1-11.
Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/ NetSys.2015.7089081 IEEE Conference Publications.
Zhu et al., Technology-Assisted Dietary Assessment. Computational Imaging VI, edited by Charles A. Bouman, Eric L. Miller, Ilya Pollak, Proc. of SPIE-IS&T Electronic Imaging, SPIE vol. 6814, 681411, Copyright 2008 SPIE-IS&T. pp. 1-10.
Whitby-Strevens, "The Transputer", 1985 IEEE, Bristol, UK.
Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.
Yanai, "Generic Image Classification Using Visual Knowledge on the Web," MM'03, Nov. 2-8, 2003, Tokyo, Japan, pp. 167-176.
Zang, et al., "A New Multimedia Message Customizing Framework for Mobile Devices", Multimedia and Expo, 2007 IEEE International Conference on Year: 2007, pp. 1043-1046, DOI: 10.1109/ ICME.2007.4284832 IEEE Conference Publications.
Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.
Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.
Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.
Jasinschi et al., A Probabilistic Layered Framework for Integrating Multimedia Content and Context Information, 2002, IEEE, p. 2057-2060. (Year: 2002).
Jones et al., "Contextual Dynamics of Group-Based Sharing Decisions", 2011, University of Bath, p. 1777-1786. (Year: 2011).
Iwamoto, "Image Signature Robust to Caption Superimpostion for Video Sequence Identification", IEEE, pp. 3185-3188 (Year: 2006).
Cooperative Multi-Scale Convolutional Neural, Networks for Person Detection, Markus Eisenbach, Daniel Seichter, Tim Wengefeld, and Horst-Michael Gross Ilmenau University of Technology, Neuroinformatics and Cognitive Robotics Lab (Year; 2016).
Chen, Yixin, James Ze Wang, and Robert Krovetz. "CLUE: cluster-based retrieval of images by unsupervised learning." IEEE transactions on Image Processing 14.8 (2005); 1187-1201. (Year: 2005).
Wusk et al (Non-Invasive detection of Respiration and Heart Rate with a Vehicle Seat Sensor; www.mdpi.com/journal/sensors; Published: May 8, 2018). (Year: 2018).
Chen, Tiffany Yu-Han, et al. "Glimpse: Continuous, real-time object recognition on mobile devices." Proceedings of the 13th ACM Confrecene on Embedded Networked Sensor Systems. 2015. (Year: 2015).

* cited by examiner

SYSTEM AND METHOD FOR DETERMINING A CONTEXTUAL INSIGHT AND PROVIDING RECOMMENDATIONS BASED THEREON

CROSS-REFERENCE TO RELATED APPLICATIONS

This application claims the benefit of U.S. Provisional Application No. 62/274,295 filed on Jan. 3, 2016. This application is also a continuation-in-part of U.S. patent application Ser. No. 14/280,928 filed on May 19, 2014, now pending, which claims the benefit of U.S. Provisional Application No. 61/833,028 filed on Jun. 10, 2013. The Ser. No. 14/280,928 application is also a continuation-in-part of U.S. patent application Ser. No. 13/856,201 filed on Apr. 3, 2013, now pending, which claims the benefit of U.S. Provisional Application No. 61/766,016 filed on Feb. 18, 2013. The Ser. No. 14/280,928 application is also a continuation-in-part (CIP) of U.S. patent application Ser. No. 13/624,397 filed on Sep. 21, 2012, now U.S. Pat. No. 9,191,626. The Ser. No. 13/624,397 application is a continuation-in-part of:

(a) U.S. patent application Ser. No. 13/344,400 filed on Jan. 5, 2012, now U.S. Pat. No. 8,959,037, which is a continuation of U.S. patent application Ser. No. 12/434,221 filed on May 1, 2009, now U.S. Pat. No. 8,112,376. The Ser. No. 12/434,221 application is a continuation-in-part of the below-referenced U.S. patent application Ser. Nos. 12/084,150 and 12/195,863;

(b) U.S. patent application Ser. No. 12/195,863 filed on Aug. 21, 2008, now U.S. Pat. No. 8,326,775, which claims priority under 35 USC 119 from Israeli Application No. 185414, filed on Aug. 21, 2007, and which is also a continuation-in-part of the below-referenced U.S. patent application Ser. No. 12/084,150; and (c) U.S. patent application Ser. No. 12/084,150 having a filing date of Apr. 7, 2009, now U.S. Pat. No. 8,655,801, which is the National Stage of International Application No. PCT/IL2006/001235 filed on Oct. 26, 2006, which claims foreign priority from Israeli Application No. 171577 filed on Oct. 26, 2005 and Israeli Application No. 173409 filed on 29 Jan. 2006.

All of the applications referenced above are herein incorporated by reference for all that they contain.

TECHNICAL FIELD

The present disclosure relates generally to the analysis of multimedia content, and more specifically to a system for providing recommendations to users based on their captured multimedia content.

BACKGROUND

With the abundance of data made available through various means in general and the Internet and world-wide web (WWW) in particular, a need to understand likes and dislikes of users has become essential for on-line businesses.

Existing solutions provide several tools to identify users' preferences. Some of these existing solutions actively require an input from the users to specify their interests. However, profiles generated for users based on their inputs may be inaccurate, as the users tend to provide only their current interests, or otherwise only provide partial information due to privacy concerns.

Other existing solutions passively track the users' activity through particular web sites such as social networks. The disadvantage with such solutions is that typically limited information regarding the users is revealed, as users tend to provide only partial information due to privacy concerns. For example, users creating an account on Facebook® provide in most cases only the minimum information required for the creation of the account. Additional information about such users may be collected over time, but may take significant amounts of time (i.e., gathered via multiple social media or blog posts over a time period of weeks or months) to be useful for accurate identification of user preferences.

It would therefore be advantageous to provide a solution that overcomes the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

The embodiments disclosed herein include a method for providing recommendations based on a user interest. The method comprises: generating at least one signature for at least one multimedia content element; querying, based on the generated at least one signature, a user profile to identify the user interest related to the at least one multimedia content element; generating at least one contextual insight based on the user interest, wherein each contextual insight indicates a user preference; searching for at least one content item that matches the at least one contextual insight; and causing a display of the at least one matching content item as a recommendation.

The embodiments disclosed herein also include a non-transitory computer-readable medium having stored thereon instructions for causing a processing system to perform a method for providing recommendations based on a user interest, wherein the instructions cause the processing system to: generate at least one signature for at least one multimedia content element; query, based on the generated at least one signature, a user profile to identify a user interest related to the at least one multimedia content element; generate at least one contextual insight based on the user interest, wherein each contextual insight indicates a user preference; search for at least one content item that matches the at least one contextual insight; and cause a display of the at least one matching content item to a user node as a recommendation.

The embodiments disclosed herein also include a system for providing recommendations based on a user interest. The system comprises: a processing system; and a memory, wherein the memory contains instructions that, when executed by the processing system, configure the system to: generate at least one signature for the received at least one multimedia content element; query, based on the generated at least one signature, a user profile to identify the user interest related to the at least one multimedia content element; generate at least one contextual insight based on the user interest, wherein each contextual insight indicates a user preference; search for at least one content item that matches the at least one contextual insight; and cause a display of the at least one matching content item to a user node as a recommendation.

BRIEF DESCRIPTION OF THE DRAWINGS

The subject matter that is regarded disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
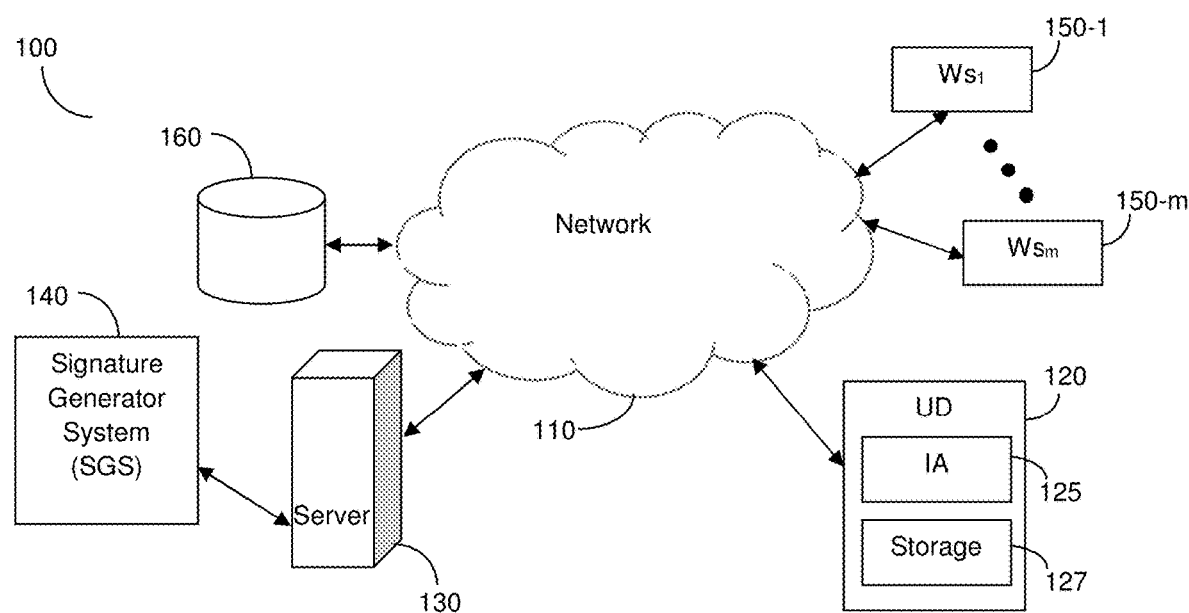
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Certain embodiments disclosed herein include a system and methods thereof for providing recommendations to users based on contextual insights. Contextual insights are generated based on a user profile of a user and a multimedia content element captured or otherwise provided by the user (via, e.g., a user device). The contextual insights are conclusions related to a current preference of users. Generating the contextual insights further includes extracting a user profile from a database of user profiles and analyzing the captured multimedia content element. The database is created based on collection and storage of user interests. The analysis of the captured multimedia content element includes generating one or more matching signatures to the multimedia content element. Based on the signatures, a concept or concepts of the multimedia content element is determined. Based on an analysis of the concept and based on the user's interest, at least one contextual interest is generated.

Upon determination of a contextual insight, recommendations to one or more content elements respective thereof are provided to the user. The recommendations may include, but are not limited to, recommendations for multimedia content, recommendations for web sites or pages (via, e.g., a hyperlink to a web page), recommendations for topics of interest (to be, e.g., utilized as a query or to customize a user profile), combinations thereof, and the like.

As a non-limiting example, if a user captured an image determined as a self-portrait photograph, which is typically referred to as a "selfie" and the user interest is determined as fashion, links through which the user can purchase clothing items that fit the user's size or preferences are provided to the user device.

A user interest may be determined, in part, based on the period of time the user viewed or interacted with the multimedia content elements; a gesture received by the user device such as, a mouse click, a mouse scroll, a tap, and any other gesture on a device having, e.g., a touch screen display or a pointing device; content viewed by the user device; and the like. User interests may further be generated at least partially based on personal parameters associated with the user, for example, demographic information related to the user. The personal parameters may be identified in, e.g., a user profile associated with the user. According to another embodiment, a user interest may be determined based on a match between a plurality of multimedia content elements viewed by a user and their respective impressions. According to yet another embodiment, a user interest may be generated based on multimedia content elements that the user uploads or shares on the web, such as social networking websites. It should be noted that the user interest may be determined based on one or more of the above identified techniques.

FIG. 1 shows a network diagram 100 utilized to describe the various disclosed embodiments. As illustrated in FIG. 1, a network 110 enables the communication between different parts of the system. The network 110 may be the Internet, the world-wide-web (WWW), a local area network (LAN), a wide area network (WAN), a metro area network (MAN), and other networks capable of enabling communication between the elements of the system 100.

Further connected to the network 110 is a user device 120. The user device 120 may be, for example, a personal computer (PC), a personal digital assistant (PDA), a mobile phone, a tablet computer, a smart phone, a wearable computing device, and the like. In some embodiments, the user device 120 may have installed therein an interest analyzer 125. The interest analyzer 125 may be a dedicated application, script, or any program code stored in a memory of the user device 120 and is executable, for example, by a processing system (e.g., microprocessor) of the user device 120. The interest analyzer 125 may be configured to perform some or all of the processes performed by a server 130 and disclosed herein.

In another embodiment, the user device 120 may include a local storage 127. The local storage 127 may include multimedia content captured or received by the user device 120. For example, the local storage 127 may include photographs and videos either captured via a camera (not shown) of the user device 120 or downloaded from a website (e.g., via the network 110).

The user device 120 is configured to at least capture and provide multimedia content elements to the server 130 connected to the network 110. The content displayed on a user device 120 may be downloaded from one of a plurality of web sources 150 (collectively referred to hereinafter as web sources 150 or individually as a web source 150, merely for simplicity purposes), may be embedded in a web-page displayed on the user device 120, or a combination thereof. The uploaded multimedia content element can be locally saved in the user device 120 or can be captured by the user device 120. For example, the multimedia content element may be an image captured by a camera installed in the user device 120, a video clip saved in the user device 120, and so on. A multimedia content element may be, for example, an image, a graphic, a video stream, a video clip, an audio stream, an audio clip, a video frame, a photograph, an image of signals (e.g., spectrograms, phasograms, scalograms, etc.), portions thereof, or combinations thereof.

The system 100 also includes the plurality of web sources 150-1 through 150-m (collectively referred to hereinafter as web sources 150 or individually as a web source 150, merely for simplicity purposes) connected to the network 110. Each of the web sources 150 may be, for example, a web server, an application server, a data repository, a database, a website, an e-commerce website, a content website and the like. The web sources 150 include multimedia content elements utilized for generating contextual insights. Alternatively or collectively, the multimedia content elements utilized for generating contextual insights may be stored in the local storage 127 of the user device 120, a storage of the server 130, or both.

The various embodiments disclosed herein may be realized using the server 130 and a signature generator system (SGS) 140. The server 130 is configured to create a profile for each user of a user device 120 as will be discussed below.

The SGS 140 is configured to generate a signature based on the multimedia content elements. The process for generating the signatures is explained in more detail herein below with respect to FIGS. 5 and 6. Each of the server 130 and the SGS 140 typically includes a processing system, such as a processor (not shown) that is communicatively connected to a memory. The memory typically contains instructions that can be executed by the processing system. The server 130 also includes an interface (not shown) to the network 110. In an embodiment, the SGS 140 can be integrated in the server 130. In an embodiment, the server 130, the SGS 140, or both may include a plurality of computational cores having properties that are at least partly statistically independent from other cores of the plurality of computational cores. The computational cores are further discussed below.

According to an embodiment, a tracking agent or other means for collecting information through the user device 120 may be configured to provide the server 130 with tracking information related to the multimedia content element viewed or uploaded by the user and related to the interaction of the user with the multimedia content element. The information may include, but is not limited to, the multimedia content element (or a URL referencing the multimedia content element), the amount of time the user viewed the multimedia content element, a user gesture made with respect to the multimedia content element, a URL of a webpage in which the element was viewed or uploaded to, a combination thereof, and so on. The tracking information is provided for each multimedia content element viewed on or uploaded via the user device 120.

The server 130 is configured to determine a user impression with respect to the received tracking information. The user impression may be determined for each multimedia content element or for a group of multimedia content elements. As noted above, the user impression indicates the user's attention with respect to a multimedia content element or group of multimedia content elements. In one embodiment, the server 130 may first filter the tracking information to remove details that are not helpful in the determination of the user impression. A user impression may be determined based on, but not limited to, a click on an element, a scroll, hovering over an element with a mouse, a change in volume, one or more key strokes, and so on. The user impression may further be determined to be either positive (i.e., demonstrating that a user is interested in the impressed element) or negative (i.e., demonstrating that a user is not particularly interested in the impressed element). According to one embodiment, a filtering operation may be performed in order to analyze only meaningful impressions. Impressions may be determined as meaningless and thereby ignored, if, for example, a value associated with the impression is below a predefined threshold.

For example, in an embodiment, if the user hovered over the element using his mouse for a very short time (e.g., less than 0.5 seconds), then such a measure is ignored. To this end, in a further embodiment, the server 130 is configured to compute a quantitative measure for the impression. In one embodiment, for each input measure that is tracked by the tracking agent, a predefined number is assigned. For example, a dwell time over the multimedia content element of 2 seconds or less may be assigned with a '5'; whereas a dwell time of over 2 seconds may be assigned with the number '10'. A click on the element may increase the value of the quantitative measure by assigning another quantitative measure of the impression. After one or more input measures of the impression have been made, the numbers related to the input measures provided in the tracking information are accumulated. The total of these input measures is the quantitative measure of the impression. Thereafter, the server compares the quantitative measure to a predefined threshold, and if the number exceeds the threshold, the impression is determined to positive. In a further embodiment, the input measure values may be weighted.

For example, in an embodiment, if a user hovers over the multimedia content element for less than 2 seconds but then clicks on the element, the score may be increased from 5 to 9 (i.e., the click may add 4 to the total number). In that example, if a user hovers over the multimedia content element for more than 2 seconds and then clicks on the element, the score may be increased from 10 to 14. In some embodiments, the increase in score may be performed relative to the initial size of the score such that, e.g., a score of 5 will be increased less (for example, by 2) than a score of 10 would be increased (for example, by 4).

The multimedia content element or elements that are determined as having a positive user impression are sent to the SGS 140. The SGS 140 is then configured to generate at least one signature for each multimedia content element or for each portion thereof. The generated signature(s) may be robust to noise and distortions as discussed below.

It should be appreciated that the signatures may be used for profiling the user's interests, because signatures typically allow for more accurate reorganization of multimedia content elements in comparison than, for example, utilization of metadata. The signatures generated by the SGS 140 for the multimedia content elements allow for recognition and classification of multimedia content elements such as content-tracking, video filtering, multimedia taxonomy generation, video fingerprinting, speech-to-text, audio classification, element recognition, video/image search and any other application requiring content-based signatures generation and matching for large content volumes such as, web and other large-scale databases. For example, a signature generated by the SGS 140 for a picture showing a car enables accurate recognition of the model of the car from any angle at which the picture was taken.

In one embodiment, the generated signatures are matched against a database of concepts (not shown) to identify a concept that can be associated with the signature and, thus, with the multimedia content element. For example, an image of a tulip would be associated with a concept structure of flowers. A concept (or a matching concept) is a collection of signatures representing a multimedia content element and metadata describing the concept. The collection of signatures is a signature reduced cluster generated by inter-matching signatures generated for the plurality of multimedia content elements. The techniques for generating concepts, concept structures, and a concept-based database are disclosed in U.S. patent application Ser. No. 13/766,463, filed on Feb. 13, 2013, now U.S. Pat. No. 9,031,999, assigned to the common assignee, which is hereby incorporated by reference.

Based on the identified concepts, the server 130 is configured to create or update the user profile. That is, for each user, when a number of similar or identical concepts for multiple multimedia content elements have been identified over time, the user's preference or interest can be established. The interest may be saved to a user profile created for the user. Whether two concepts are sufficiently similar or identical may be determined by, e.g., performing concept matching between the concepts. The matching concept is represented using at least one signature. Techniques for concept matching are disclosed in U.S. patent application Ser. No. 14/096,901, filed on Dec. 4, 2013, assigned to common assignee, which is hereby incorporated by reference for all the useful information it contains.

For example, a concept of flowers may be determined as associated with a user interest in 'flowers' or 'gardening.' In one embodiment, the user interest may simply be the identified concept. In another embodiment, the interest may be determined using an association table which associates one or more identified concepts with a user interest. For example, the concept of 'flowers' and 'spring' may be associated with the interest of 'gardening'. Such an association table may be maintained in the server 130 or in the data warehouse 160.

According to the disclosed embodiment, the server 130 is further configured to generate a contextual insight based on the user's interest and on the analysis of a multimedia content element captured by the user device 120. Contextual insights are conclusions determined by the system related to a current preference of users. Upon receiving at least one multimedia content element from the user device 120, at least one signature is generated for the received multimedia content element. The signature is generated by the SGS 140 utilized by the server 130. According to an embodiment, the server 130 is configured to determine a concept based on the at least one generated signature.

The server 130 queries the user profile stored in the database 160 to determine at least one user interest based on the determined concept. Based on a response to the query, the server 130 is configured to generate a contextual insight for the at least one user interest and the at least one signature. The server 130 is configured to search for one or more content items matching the contextual insight. The search may include querying one or more of the plurality of web sources 150. Upon identification of at least one matching content item, the at least one matching content item is provided as recommendations for display on a display of the user device 120. The server 130 may be configured to cause the recommendations to be displayed on the user device 120.

It should be noted that certain tasks performed by the server 130 and the SGS 140 may be carried out, alternatively or collectively, by the user device 120 and the interest analyzer 125. Specifically, in an embodiment, signatures may be generated by a signature generator (not shown in FIG. 1) of the user device 120. In another embodiment, the interest analyzer 125 may be configured to generate contextual insights and to search for content items matching the contextual insights. The interest analyzer 125 may be further configured to identify matching content items and to cause a display of the matching content items on the user device 120 as recommendations. An example block diagram of an interest analyzer 125 installed on a user device 120 is described further herein below with respect to FIG. 2.

It should further be noted that the signatures may be generated for multimedia content elements stored in the web sources 150, in the local storage 127 of the user device 120, or a combination thereof.

Figure 2:
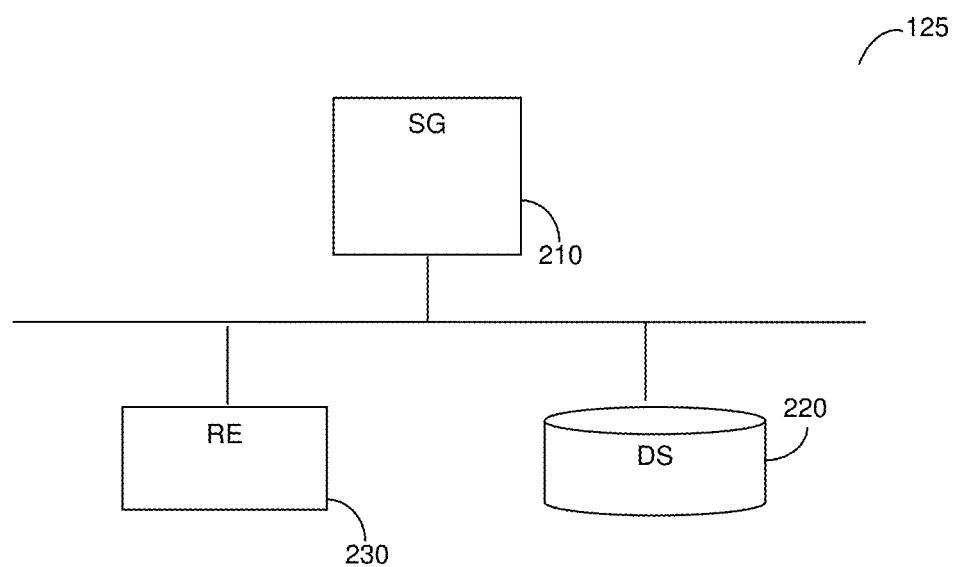
FIG. 2 is a block diagram of an interest analyzer utilized to describe the various disclosed embodiments.

FIG. 2 depicts an example block diagram of an interest analyzer 125 installed on the user device 120 according to an embodiment. The interest analyzer 125 may be configured to access an interface a user device or a server. The interest analyzer 125 is further communicatively connected to a processing system (e.g., a processing system of the user device 120, not shown) such as a processor and to a memory (e.g., a memory of the user device 120, not shown). The memory contains therein instructions that, when executed by the processing system, configures the interest analyzer 125 as further described hereinabove and below. The interest analyzer 125 may further be communicatively connected to a storage unit (e.g., the storage 127 of the user device 120, not shown) including a plurality of multimedia content elements.

In an embodiment, the interest analyzer 125 includes a signature generator (SG) 210, a data storage (DS) 220, and a recommendations engine 230. The signature generator 210 may be configured to generate signatures for multimedia content elements. In a further embodiment, the signature generator 210 includes a plurality of computational cores as discussed further herein above, where each computational core is at least partially statistically independent of the other computations cores.

The data storage 220 may store a plurality of multimedia content elements, a plurality of concepts, signatures for the multimedia content elements, signatures for the concepts, or a combination thereof. In a further embodiment, the data storage 220 may include a limited set of concepts relative to a larger set of known concepts. Such a limited set of concepts may be utilized when, for example, the data storage 220 is included in a device having a relatively low storage capacity such as, e.g., a smartphone or other mobile device, or otherwise when lower memory use is desirable.

The recommendations engine 230 may be configured to generate contextual insights based on multimedia content elements related to the user interest, to query sources of information (including, e.g., the data storage 220 or another data source), and to cause a display of recommendations on the user device 120.

According to an embodiment, the interest analyzer 125 is configured to receive at least one multimedia content element. The interest analyzer 125 is configured to initialize a signatures generator (SG) 210 to generate at least one signature for the received at least one multimedia content element. The memory further contains instructions to query a user profile of the user stored in a data storage (DS) 220 to determine a user interest. The memory further contains instructions to generate a contextual insight based on the user interest and the at least one signature. Based on the contextual insight, a recommendations engine 230 is initialized to search for one or more content items that match the contextual insight. The matching content items may be provided by the recommendations engine 230 to the user as recommendations via the interface.

Each of the recommendations engine 230 and the signature generator 210 can be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

In certain implementations, the recommendation engine 230, the signature generator 210, or both can be implemented using an array of computational cores having properties that are at least partly statistically independent from other cores of the plurality of computational cores. The computational cores are further discussed below.

According to another implementation, the processes performed by the recommendation engine 230, the signature generator 210, or both can be executed by a processing system of the user device 120 or of the server 130. Such processing system may include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

It should be noted that, although FIG. 2 is described with respect to an interest analyzer 125 included in the user device 120, any or all of the components of the interest analyzer 125 may be included in another system or systems (e.g., the server 130, the signature generator system 140, or both) and utilized to perform some or all of the tasks described herein without departing from the scope of the disclosure. As an example, the interest analyzer 125 operable in the user device 120 may send multimedia content elements to the signature generator system 140 and may receive corresponding signatures therefrom. As another example, the user device 120 may send signatures to the server 130 and may receive corresponding recommendations or concepts therefrom. As yet another example, the interest analyzer 125 may be included in the server 130 and may provide recommendations to the user device 120 based on multimedia content elements identified by or received from the user device 120.

Figure 3:
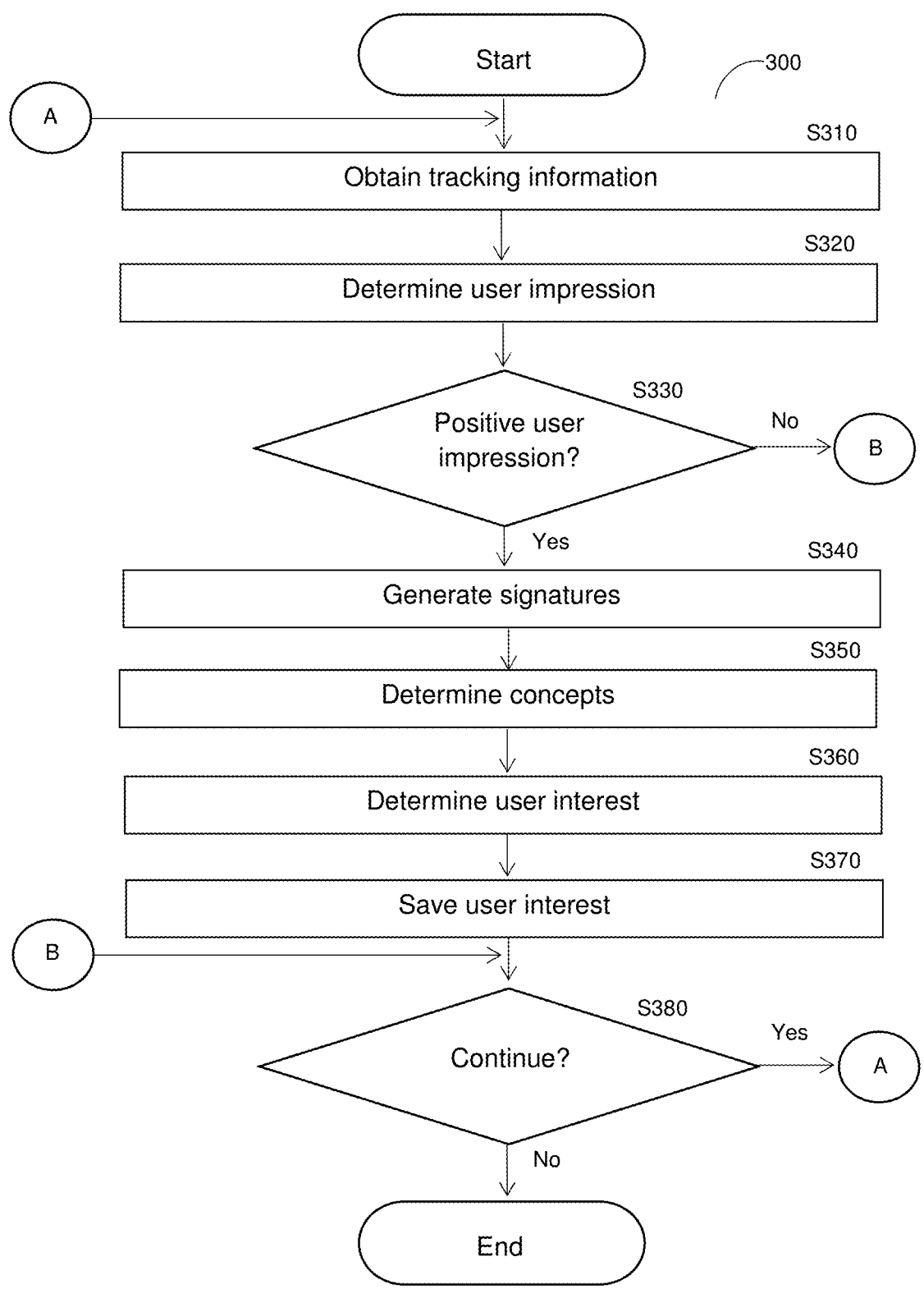
FIG. 3 is flowchart illustrating a method for profiling user interests according to an embodiment.

FIG. 3 depicts an example flowchart 300 illustrating a method for creating user profiles according to an embodiment. It should be noted that, in an embodiment, tracking information is collected by a user device. In various embodiments, tracking information may be collected from other sources such as, e.g., a database. In an embodiment, the method may be performed by a server (e.g., the server 130).

At S310, tracking information is obtained via a user device (e.g., the user device 120-1). In an embodiment, the obtained tracking information may be received from, e.g., an agent installed on the user device and configured to collect tracking information. In a further embodiment, S310 may include filtering the tracking information. As noted above, the tracking information is collected with respect to a multimedia content element displayed over the user device. In an embodiment, the tracking information may include, but is not limited to, the multimedia content element (or a link thereto) displayed on the user device and user gestures with respect to displayed multimedia content element. In an embodiment, the tracking information may be collected via a web browser executed by the user device.

At S320, one or more user impressions is determined based on the obtained tracking information. In a further embodiment, each user impression may be assigned a score based on a value of the user gestures utilized to determine the user impression. The score may further be positive or negative. In yet a further embodiment, S320 may include filtering the user impressions so as to only determine meaningful impressions. The filtering may include, for example, filtering out any user impressions associated with a score that is below a predefined threshold.

The user impressions may be determined based on user gestures such as, but not limited to, a click on an element, a scroll, hovering over an element with a mouse, a change in volume, one or more key strokes, a combination thereof, and so on. The user impressions may further be determined to be either positive (i.e., demonstrating that a user is interested in the impressed element) or negative (i.e., demonstrating that a user is not particularly interested in the impressed element). One embodiment for determining the user impression is described herein above. The user impression is determined for one or more multimedia content elements identified in the tracking information.

At S330, it is checked if any of the user impressions is positive and, if so, execution continues with S340; otherwise, execution continues with S380. Whether a user impression is positive is discussed further herein above with respect to FIG. 1.

At S340, at least one signature is generated for each multimedia content element that is associated with a positive user impression. As noted above, the tracking information may include the actual multimedia content element or a link thereto. In the latter case, the multimedia content element is first retrieved from its location. The at least one signature for the multimedia content element may be generated by a SGS (e.g., the SGS 140) as described further herein below.

At S350, one or more concepts related to the multimedia content elements associated with positive user impressions is determined. In an embodiment, S350 includes querying a concept-based database using the generated signatures. In a further embodiment, S350 may include matching the generated signatures to at least one signature associated with concepts in the concept-based database. In yet a further embodiment, each of the concepts may be associated with one or more particular portions of the multimedia content element. As an example, a multimedia content element image of a man wearing a baseball shirt may be associated with the concept "baseball fan," and the portions of the image related to the man may be associated with the concept "man" and the portions of the image related to the shirt may be associated with the concept "sports clothing" or "baseball."

At S360, based on the determined concepts, the user interest is determined. Determining the user interest may include, but is not limited to, identifying a positive user impression with respect to any of the concepts. In an embodiment, the user interest may be further determined with respect to particular portions of the multimedia content element and user gestures related to those particular portions. For example, if a multimedia content element is an image showing a dog and a cat, a click on a portion of the image showing the dog may indicate a positive impression (and, therefore, a user interest), in "dogs" but not necessarily a user interest in "cats."

As a non-limiting example of determining user interest, the user views a web-page that contains an image of a car. The image is then analyzed and a signature is generated respective thereto. As it appears that the user spent time above a certain threshold viewing the image of the car, the user's impression is determined as positive. It is therefore determined that a user interest is "cars."

At S370, the determined user interest is saved as part of a user profile for the user in a database (e.g., the database 160). It should be noted that if no user profile for the user exists in the database, a user profile may be created for the user. It should be noted that a unique user profile may be created for each user of a user device. The user may be identified by a unique identification number assigned, for example, by the tracking agent. The unique identification number typically does not reveal the user's identity. The user profile can be updated over time as additional tracking information is gathered and analyzed by the server. In an embodiment, the server 130 analyzes the tracking information only when a sufficient amount of additional tracking information has been collected.

At S380, it is determined whether additional tracking information is received and, if so, execution continues with S310; otherwise, execution terminates. As noted above, in an embodiment, S380 may include determining whether a sufficient amount of additional tracking information has been received.

As a non-limiting example, tracking information including a video featuring a cat playing with a toy and a cursor hovering over the cat for 20 seconds is obtained from an agent installed on a user device. Based on the tracking information and, specifically, the cursor hovering over the cat for more than 5 seconds, it is determined that a user impression of the video is positive. A signature is generated for the video, and a concept of "cats" is determined. Based on the positive user impression of the concept of "cats," a user interest in "cats" is determined. The user interest is saved as part of a user profile of the user.

Figure 4:
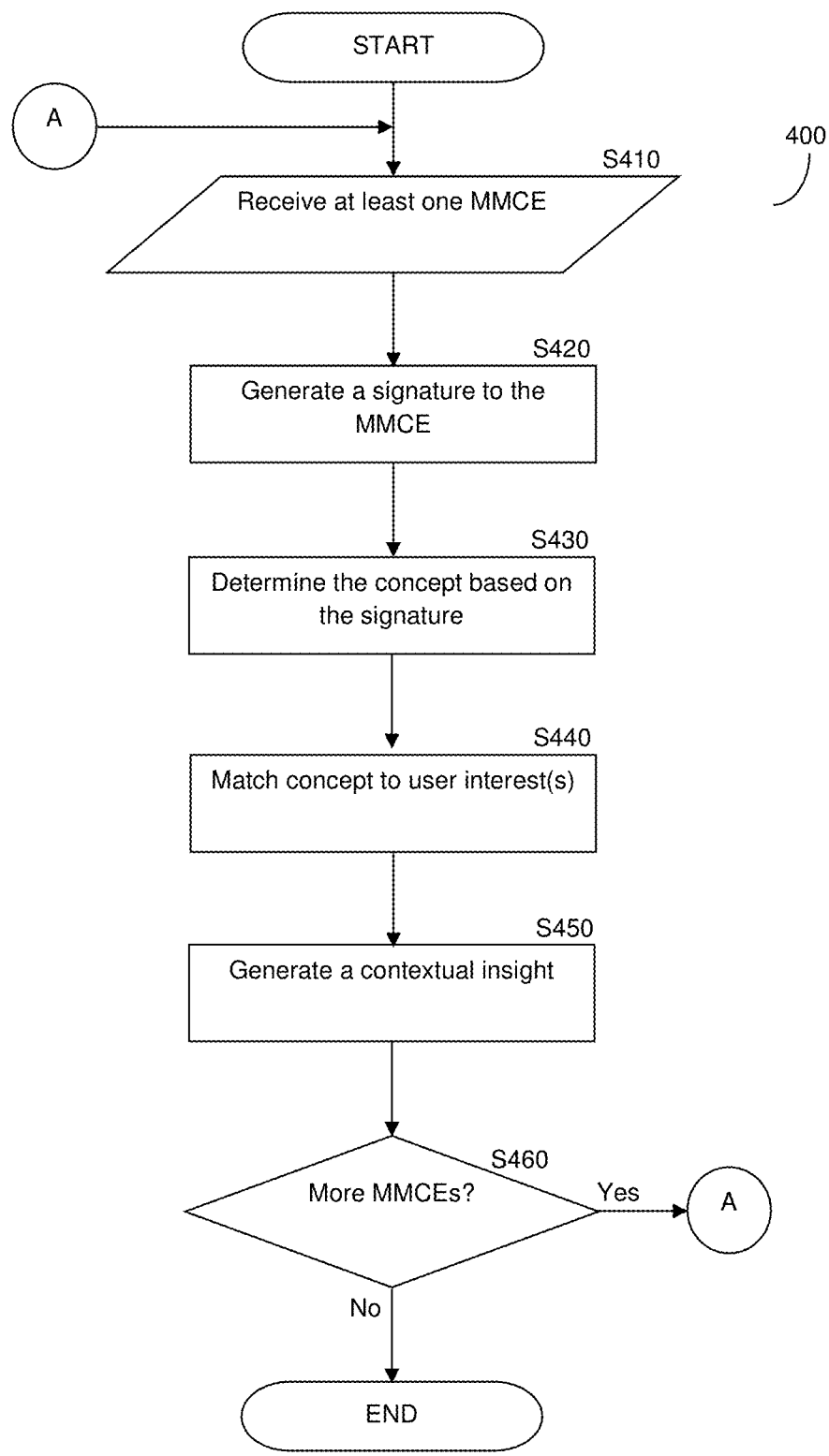
FIG. 4 is a flowchart illustrating a method for generating contextual insights based on analysis of a user's interests and a multimedia content element according to another embodiment.

FIG. 4 depicts an example flowchart 400 illustrating a method for generating contextual insights according to another embodiment.

At S410, at least one multimedia content element is received. The multimedia content element may be, for example, an image, a graphic, a video stream, a video clip, an audio stream, an audio clip, a video frame, a photograph, an image of signals (e.g., spectrograms, phasograms, scalograms, etc.), combinations thereof, or portions thereof. The at least one multimedia content element may be captured by a sensor included in a user device (e.g., the user device 120).

At S420, at least one signature is generated for each received multimedia content element. The signatures for the multimedia content elements are typically generated by a SGS (e.g., the SGS 140) as described hereinabove.

At optional S430, at least one concept is determined for each generated signature. In an embodiment, S430 includes querying a concept-based database using the generated signatures. In a further embodiment, the generated signatures are matched to signatures representing concepts stored in the concept-based database, and concepts associated with matching the generated signatures above a predetermined threshold may be determined.

At S440, the generated signatures or the determined concepts are matched to user interests associated with the user. The user interests may be extracted from a user profile stored in a database (e.g., the database 160). In an embodiment, matching the concepts to the user interests may include matching signatures representing the determined concepts to signatures representing the user interests.

At S450, at least one contextual insight is generated based on a match between the user interest and the concept(s) or signature(s). The contextual insights are conclusions related to a preference of the user. For example, if a user interest is "motorcycles" and a concept related to multimedia content elements viewed by the user is "red vehicles," a contextual insight may be a user preference for "red motorcycles." As another example, if a user interest is "shopping" and a concept related to multimedia content elements viewed by the user is "located in Las Vegas, Nev.," a contextual insight may be a preference for shopping outlets in Las Vegas, Nev.

At S460, it is checked whether additional multimedia content elements are received and, if so, execution continues with S410; otherwise, execution terminates.

Figure 5:
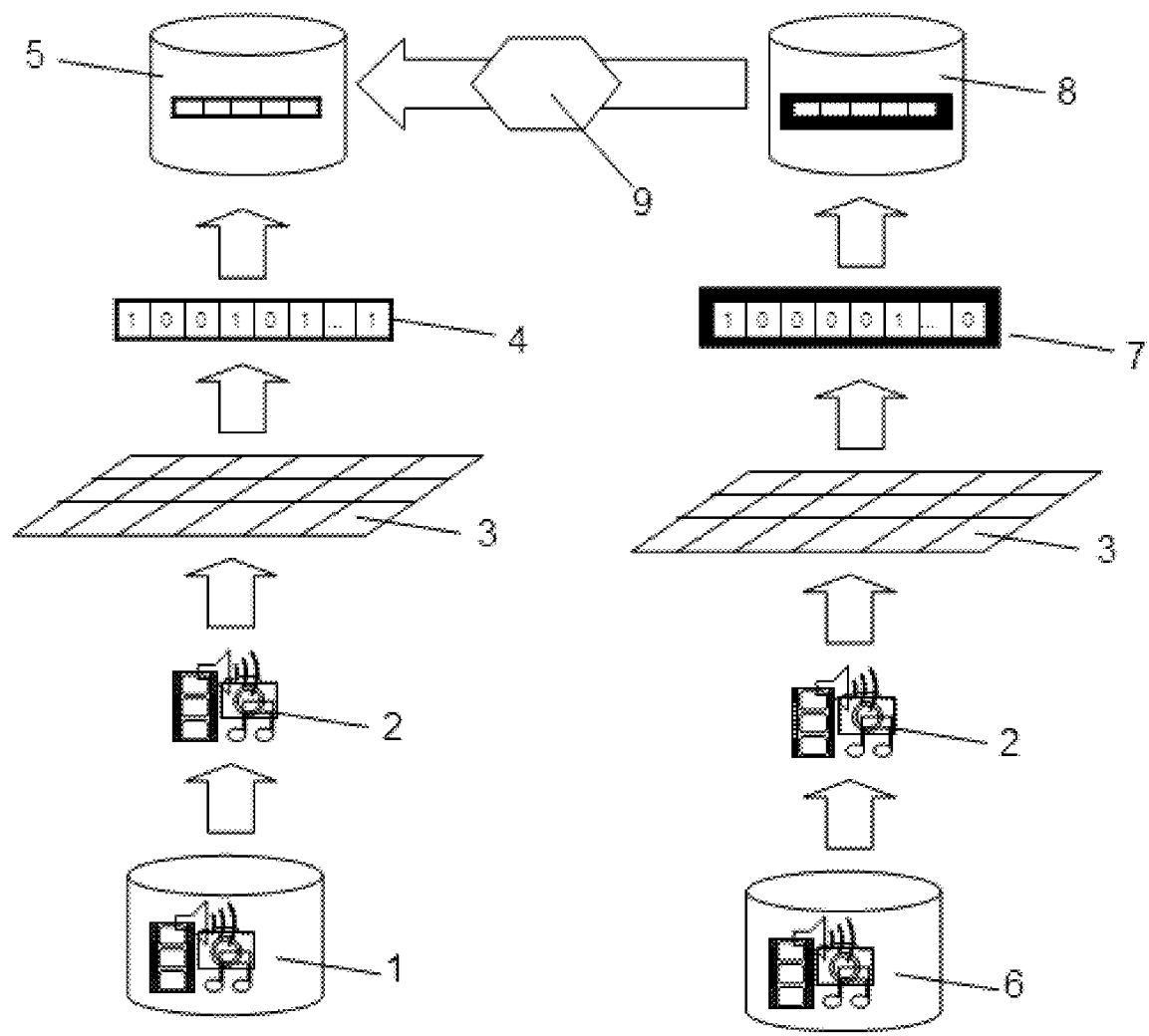
FIG. 5 is a block diagram depicting the basic flow of information in the signature generator system.
Figure 6:
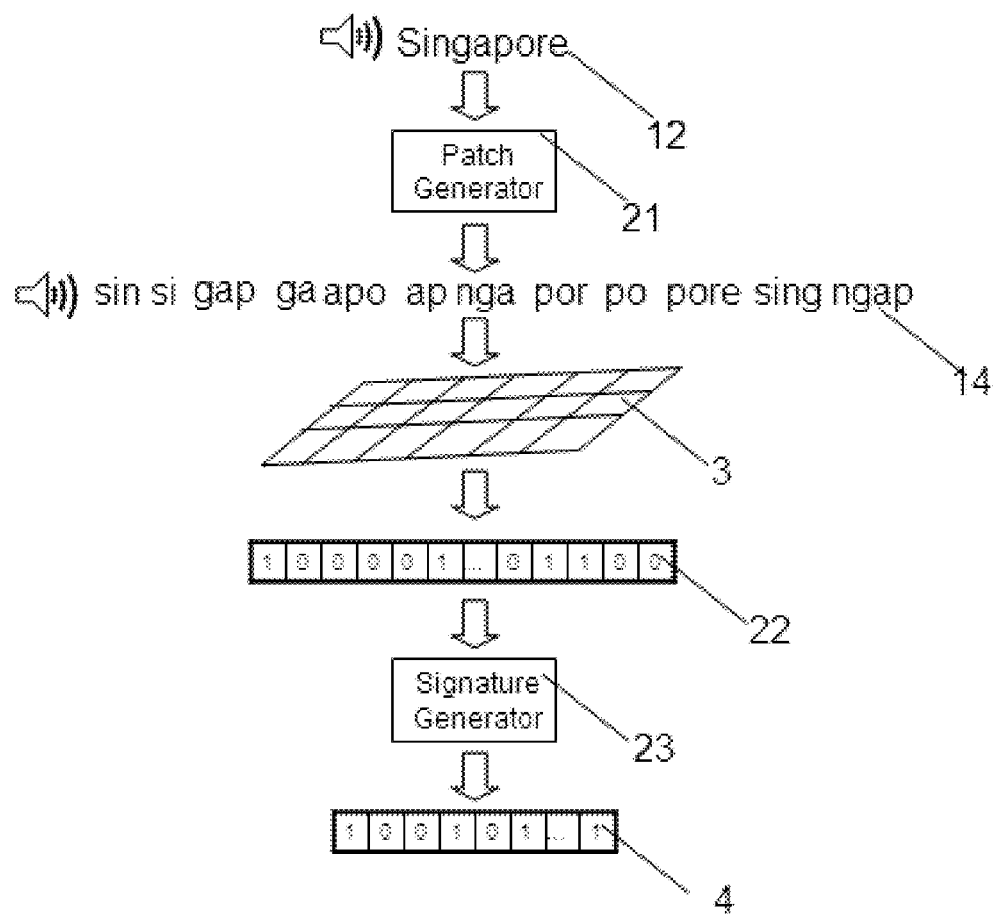
FIG. 6 is a diagram showing the flow of patches generation, response vector generation, and signature generation in a large-scale speech-to-text system.

FIGS. 5 and 6 illustrate the generation of signatures for the multimedia content elements by the SGS 140 according to one embodiment. An exemplary high-level description of the process for large scale matching is depicted in FIG. 4. In this example, the matching is for a video content.

Video content segments 2 from a Master database (DB) 6 and a Target DB 1 are processed in parallel by a large number of independent computational Cores 3 that constitute an architecture for generating the Signatures (hereinafter the "Architecture"). Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 5. Finally, Target Robust Signatures and/or Signatures are effectively matched, by a matching algorithm 9, to Master Robust Signatures and/or Signatures database to find all matches between the two databases.

To demonstrate an example of signature generation process, it is assumed, merely for the sake of simplicity and without limitation on the generality of the disclosed embodiments, that the signatures are based on a single frame, leading to certain simplification of the computational cores generation. The Matching System is extensible for signatures generation capturing the dynamics in-between the frames.

The Signatures' generation process is now described with reference to FIG. 5. The first step in the process of signatures generation from a given speech-segment is to break down the speech-segment to K patches 14 of random length P and random position within the speech segment 12. The breakdown is performed by the patch generator component 21. The value of the number of patches K, random length P and random position parameters is determined based on optimization, considering the tradeoff between accuracy rate and the number of fast matches required in the flow process of the server 130 and SGS 140. Thereafter, all the K patches are injected in parallel into all computational Cores 3 to generate K response vectors 22, which are fed into a signature generator system 23 to produce a database of Robust Signatures and Signatures 4.

In order to generate Robust Signatures, i.e., Signatures that are robust to additive noise L (where L is an integer equal to or greater than 1) by the Computational Cores 3, a frame 'i' is injected into all the Cores 3. Then, Cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $Ci=\{n_i\}$ ($1 \le i \le L$) may consist of a single leaky integrate-to-threshold unit (LTU) node or more nodes. The node $n_i$ equations are:

$$V_i = \sum_j w_{ij} k_j$$

$$n_i = \theta(Vi - Thx)$$

where, $\theta$ is a Heaviside step function; $w_{ij}$ is a coupling node unit (CNU) between node i and image component j (for example, grayscale value of a certain pixel j); $k_j$ is an image component 'j' (for example, grayscale value of a certain pixel j); $Th_x$ is a constant Threshold value, where x is 'S' for Signature and 'RS' for Robust Signature; and $V_i$ is a Coupling Node Value.

The Threshold values $Th_X$ are set differently for Signature generation and for Robust Signature generation. For example, for a certain distribution of values (for the set of nodes), the thresholds for Signature ($Th_S$) and Robust Signature ($Th_{RS}$) are set apart, after optimization, according to at least one or more of the following criteria:

1: For: $V_i > Th_{RS}$
  $1-p(V > Th_S)-1-(1-\varepsilon)^l \ll 1$
  i.e., given that I nodes (cores) constitute a Robust Signature of a certain image I, the probability that not all of these I nodes will belong to the Signature of a same, but noisy image, Ĩ is sufficiently low (according to a system's specified accuracy).

2: $p(V_i > Th_{RS}) \approx l/L$
  i.e., approximately I out of the total L nodes can be found to generate a Robust Signature according to the above definition.

3: Both Robust Signature and Signature are generated for certain frame i.

It should be understood that the generation of a signature is unidirectional, and typically yields lossless compression, where the characteristics of the compressed data are maintained but the uncompressed data cannot be reconstructed. Therefore, a signature can be used for the purpose of comparison to another signature without the need of comparison to the original data. The detailed description of the Signature generation can be found U.S. Pat. Nos. 8,326,775 and 8,312,031, assigned to the common assignee, which are hereby incorporated by reference for all the useful information they contain.

A Computational Core generation is a process of definition, selection, and tuning of the parameters of the cores for a certain realization in a specific system and application. The process is based on several design considerations, such as:

(a) The Cores should be designed so as to obtain maximal independence, i.e., the projection from a signal space should generate a maximal pair-wise distance between any two cores' projections into a high-dimensional space.

(b) The Cores should be optimally designed for the type of signals, i.e., the Cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power.

(c) The Cores should be optimally designed with regard to invariance to a set of signal distortions, of interest in relevant applications.

Detailed description of the Computational Core generation and the process for configuring such cores is discussed in more detail in the U.S. Pat. No. 8,655,801 referenced above.

Figure 7:
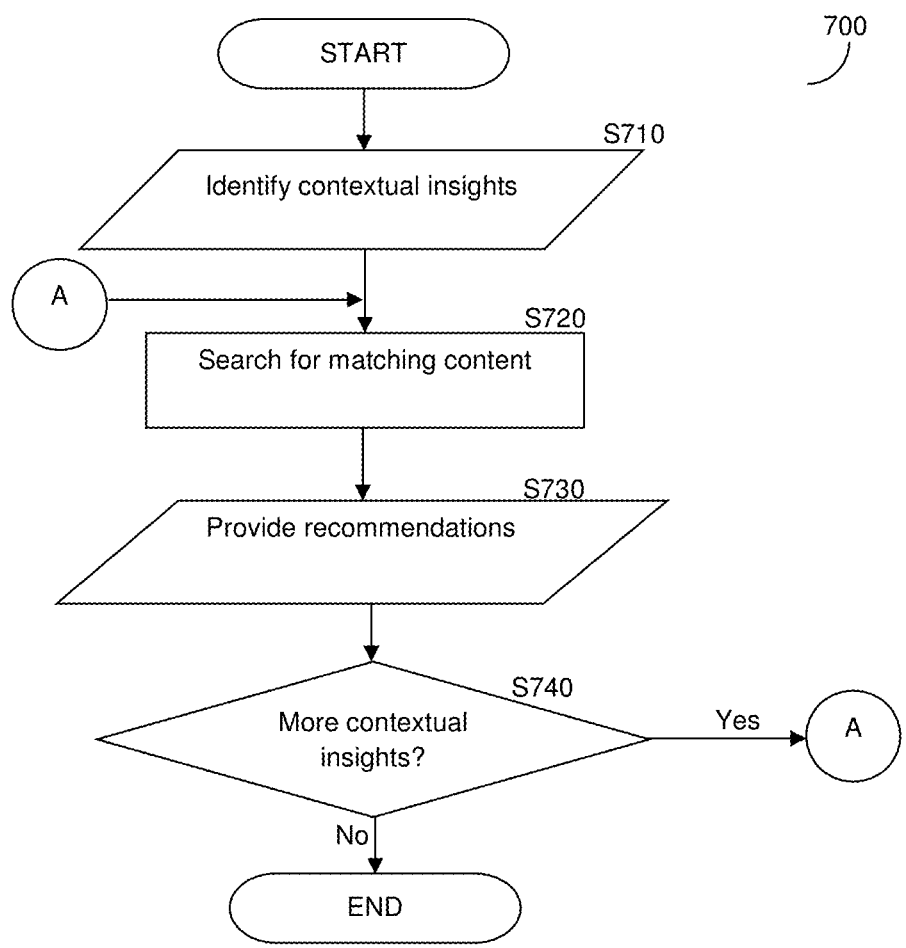
FIG. 7 is a flowchart describing a method for providing recommendations for multimedia content elements to a user based on contextual insights according to an embodiment.

FIG. 7 depicts an example flowchart 700 illustrating a method for providing recommendations to users based on contextual insights according to an embodiment. It should be noted that, in various embodiments, recommendations may be provided without first receiving multimedia content elements to analyze. In such embodiments, recommendations may be determined and provided in response to, e.g., a predetermined event, input from a user, and so on. As a non-limiting example, a user may request a recommendation for a movie or TV show to watch on a video streaming content website based on his or her interests.

At S710, at least one contextual insight indicating a preference of the user is identified. In an embodiment, the at least one contextual insight may be identified based on, but not limited to, a request for a recommendation, a user profile of the user, a multimedia content element provided by the user (via, e.g., a user device), a combination thereof, and the like. In another embodiment, the at least one contextual insight may be generated as described further herein above with respect to FIG. 4.

At S720, a search for content items matching the identified contextual insights is performed. The matching content items may include, but are not limited to, multimedia content elements, web-pages featuring matching content, electronic documents featuring matching content, combinations thereof, and the like. In an embodiment, S720 may include matching signatures representing the identified contextual insights to signatures of content items of one or more web sources. As an example, if a contextual insight is a preference for "police dramas," content items related to television and movie dramas prominently featuring police and detectives may be found during the search.

At S730, upon identification of at least one matching content item, the at least one matching content item is provided as a recommendation to the user device. Providing the matching content items as recommendations may include, but is not limited to, providing one or more links to each content item, providing identifying information about each content item, sending the content items to the user device, notifying the user of content items existing on the user device, combinations thereof, and so on.

At S740, it is checked whether additional contextual insights are identified and, if so, execution continues with S720; otherwise, execution terminates.

As a non-limiting example, in case the user is determined as currently viewing an image of a vehicle such as a Ford® Focus, and a user profile indicates that he is based in Manhattan, N.Y., a link to a financing institution that offers financing plans for purchasing vehicles may be found and provided as a recommendation to the user device.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices.

The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for providing recommendations based on a user interest, comprising: generating at least one signature for at least one multimedia content element; querying, based on the generated at least one signature, a user profile to identify the user interest related to the at least one multimedia content element; generating at least one contextual insight based on the user interest, wherein each contextual insight indicates a user preference; searching for at least one content item that matches the at least one contextual insight; causing a display of the at least one matching content item as a recommendation; and wherein each signature is generated by a signature generator system, wherein the signature generator system includes a plurality of computational cores configured to receive a plurality of unstructured data elements, each computational core of the plurality of computational cores having properties that are at least partly statistically independent of other of the computational cores, the properties are set independently of each other core.

2. A system for providing recommendations based on a user interest, comprising: a signature generator system; a processing system; and a memory, wherein the memory contains instructions that, when executed by the processing system, configure the system to: generate at least one signature for the received at least one multimedia content element; query, based on the generated at least one signature, a user profile to identify the user interest related to the at least one multimedia content element; generate at least one contextual insight based on the user interest, wherein each contextual insight indicates a user preference; search for at least one content item that matches the at least one contextual insight; and cause a display of the at least one matching content item to a user node as a recommendation; wherein each of the generated at least one signature is generated by the signature generator system, wherein the signature generator system includes a plurality of computational cores configured to receive a plurality of unstructured data elements, each computational core of the plurality of computational cores having properties that are at least partly statistically independent of other of the computational cores, the properties are set independently of each other core.

* * * * *